April 25, 1950
A. S. DEARBORN
2,504,966
SAFETY SHUTTER FOR PICTURE PROJECTORS
Filed Aug. 15, 1946
3 Sheets-Sheet 1
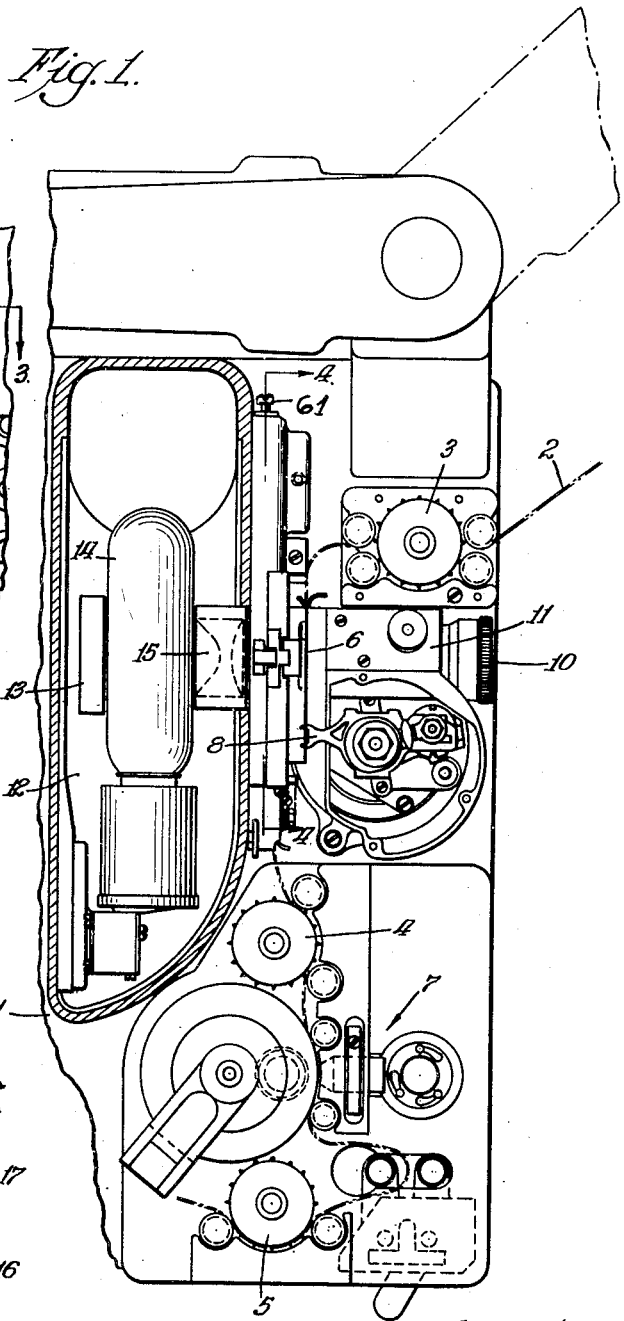

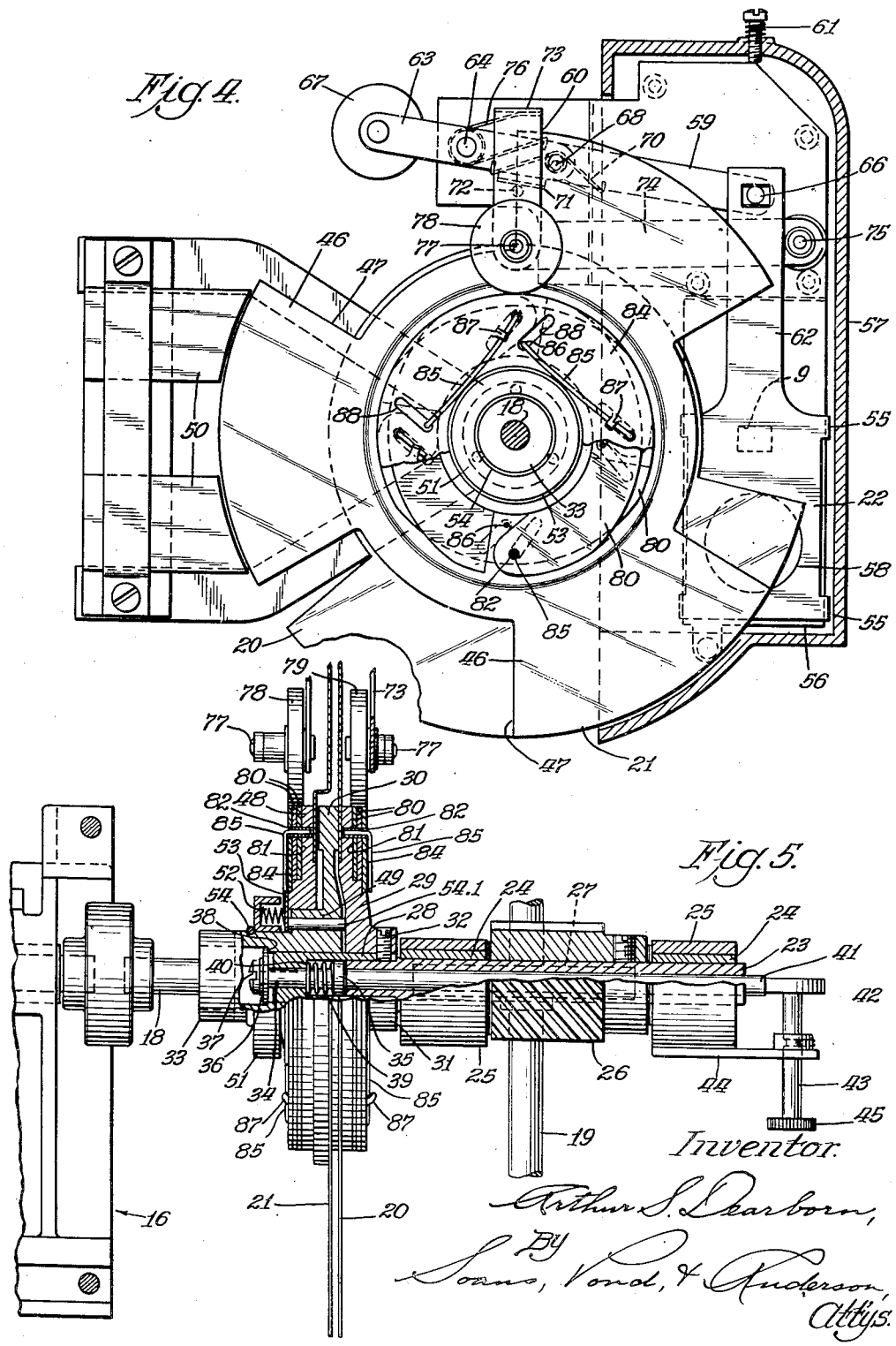

April 25, 1950 — A. S. DEARBORN — 2,504,966
SAFETY SHUTTER FOR PICTURE PROJECTORS
Filed Aug. 15, 1946 — 3 Sheets-Sheet 3

Inventor
Arthur S. Dearborn,
By Soans, Pond, & Anderson,
Attys.

Patented Apr. 25, 1950

2,504,966

UNITED STATES PATENT OFFICE 2,504,966

SAFETY SHUTTER FOR PICTURE PROJECTORS

Arthur S. Dearborn, Chicago, Ill., assignor to Ampro Corporation, Chicago, Ill., a corporation of Illinois Application August 15, 1946, Serial No. 690,699

4 Claims. (Cl. 88—18)

This invention relates to picture projecting machines and more particularly to the shutters for protecting the film against blistering. The invention is particularly adapted for use in connection with cinematographs, but it may also be used in connection with stereopticon projectors.

The main objects of this invention are to provide a cinematograph having improved operating mechanism for actuating the film feeding claw and the usual motion picture interrupter shutter in unison; to provide an improved form of fire shutter which will automatically be in operative position whenever the film feeding mechanism is inoperative so as to thereby protect the film against burning by heat radiated from the source of light employed for projection purposes; to provide an improved form of safety shutter adapted to traverse the path of light so as to intermittently eclipse the light beam immediately upon the stopping of the motion picture shutter and film feeding claw so as to permit the showing of a "still" picture without injury to the film; to provide improved means for attracting the "still" picture shutter to an inoperative position during the feeding of the film; to provide improved actuating means for automatically moving the fire shutter to inoperative position when either the motion picture interrupter shutter or the "still" picture shutter is in operation; to provide an improved manually controlled clutch for operatively connecting said operating mechanism with either the motion picture interrupter shutter or the "still" picture shutter; and to provide a cinematograph of this kind having its shutters and their operating mechanism constructed and arranged so as to occupy a minimum amount of space.

An illustrative embodiment of this invention is shown in the accompanying drawings, wherein:

Figure 1 is a fragmentary side elevation of a cinematograph to which this invention is applied.

Figure 2 is a fragmentary side elevation, partly in section, taken from the rear of Figure 1, showing the improved shutters and operating mechanism.

Figure 3 is an enlarged horizontal section, taken on the line 3—3 of Fig. 2.

Figure 4 is an enlarged transverse vertical section taken on the line 4—4 of Figure 1 and showing the fire shutter in operative position.

Figure 5 is an enlarged detail, partly in elevation and partly in section, of the interrupter shutter and "still" picture shutter and the operating mechanism.

Figures 6, 7, 8:
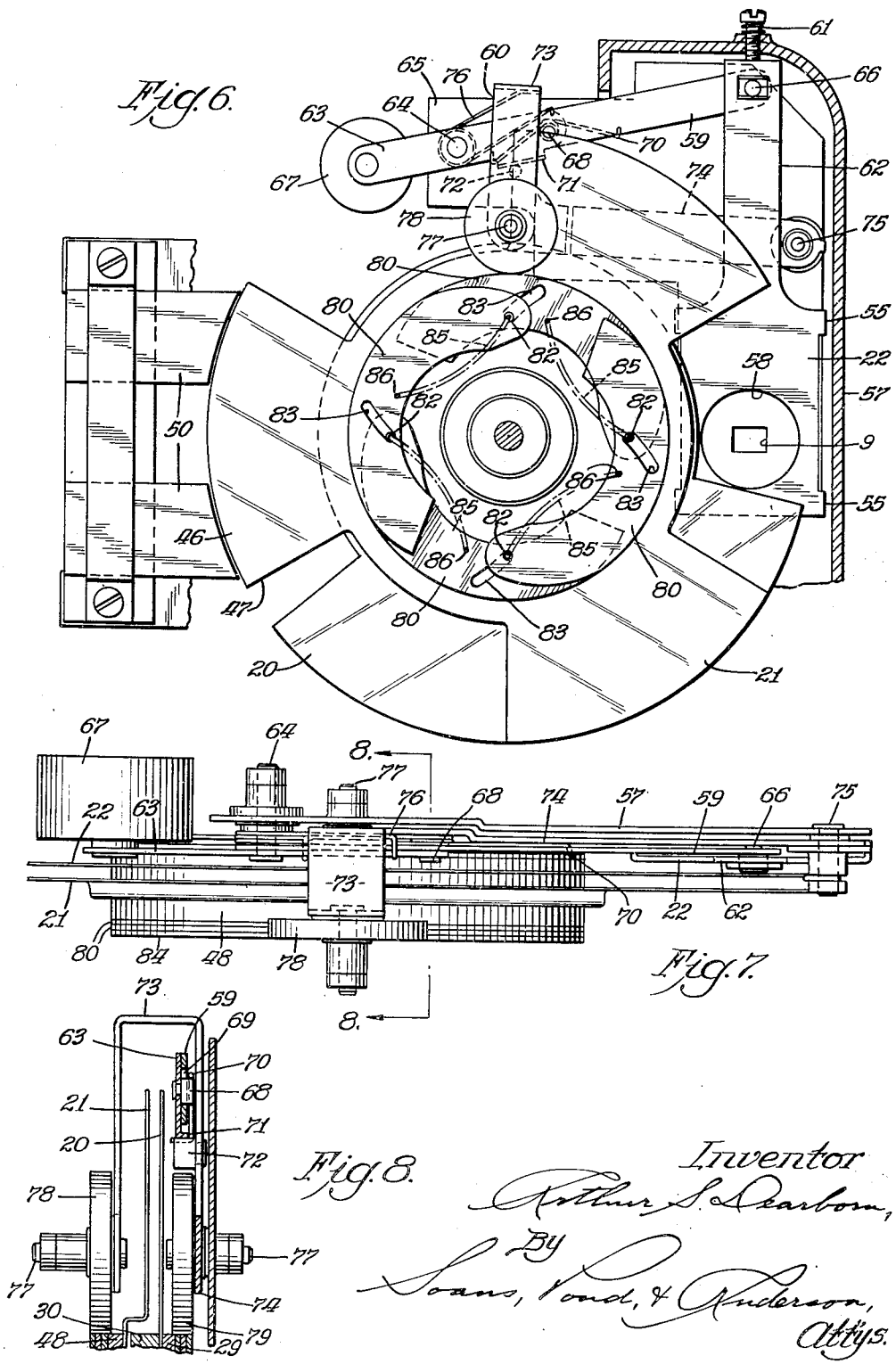
Figure 6 is a view similar to Figure 4 but showing the fire shutter in its operative position.
Figure 7 is an enlarged top plan view of the three shutters and the actuating mechanism which controls the fire shutter.
Figure 8 is a fragmentary vertical section taken on the line 8—8 of Figure 7.

The heat rays contained in the beam of light used in a motion picture projector will blister or burn the picture film if any given portion of the film is allowed to remain in the path of the beam of light for any appreciable length of time. This blistering does not occur in the case of motion picture projection because of the high speed at which the film is fed. The projected portion of the picture film is moved out of the path of the light beam and another portion of the film is brought into place, sixteen times per second in silent pictures and twenty-four times per second in sound motion pictures. During the projection of any given portion of the picture film, the beam of light is intercepted by the motion picture interrupter shutter of the projector a minimum of forty-eight times per second, once to make the screen dark while another section of film is being moved into the path of the light beam, and twice during the projection of the image contained on any given portion of the picture film. The necessity for this mechanical procedure is physiological. The visual apparatus does not respond instantly to a given stimulus, nor does the sensation cease immediately when the stimulus is removed. Hence, if the eye is exposed to a source whose intensity is varied rapidly, the persistence of vision may prevent the flicker from being detected. The highest frequency at which flicker is just perceptible is known as the critical frequency.

Although the eye retains an image for a sufficiently long period of time with the screen dark so that it is possible to move the picture film from a portion containing one picture to the portion containing the next picture if at least sixteen changes per second are made, it is necessary to produce a minimum of forty-eight flashes of light per second if the human eye is to register the sensation of continuous light, i. e., to avoid flicker. Therefore, since one interruption of the light is necessary while moving the film from picture to picture, the projector mechanism, to avoid the sensation of flicker, must produce a minimum of forty-eight light flashes per second regardless of the number of individual pictures projected on the screen per second, whether it be sixteen frames, as in silent motion pictures, or twenty-four frames, as in the case of sound motion pictures.

The cause of the film blistering or burning, of course, is due to the fact that the heat from the heat rays contained in the beam of light from the projection lamp is absorbed faster than it is dissipated from the film by conduction through the film supporting structures and by convection through the medium of the air surrounding the film and its supporting structures. Other conditions being equal, if a period of time were allowed for dissipation of the absorbed heat equal to the time allowed for the absorption of heat, the temperature of the film and its surrounding structures would not be increased beyond that of the atmosphere surrounding the projector and any given portion of the film might remain in the path of the light beam indefinitely, thus allowing the projection of any scene on the picture film as a "still" picture. However, it is not necessary to maintain the film at normal room temperature since the film will endure a considerable increase in temperature above normal room temperature before injury will occur.

If a rotary shutter is so placed that during its cycle of movement it intercepts the light beam somewhere between the light source and the picture film, the film and its supporting structures are not heated during the period of time necessary for the passage of the shutter blade across the path of the light beam and during this period of time the heat which has been absorbed during the period of projection is being dissipated by conduction and convection as previously described. Should the rotary shutter be so constructed or so operated that the period of interception equals the period of projection, the film would not blister if the shutter and film are operated at motion picture speed. The period of time allowed for absorption of heat must not be too long or the temperature of the film will rise to the critical point at which blistering will occur.

It is not necessary that the periods of interception and projection be equal, but the period allowed for dissipation must be sufficiently long to protect the film from injury and it is necessary that the interception periods be of equal duration, or very nearly so, in order to prevent the sensation of flicker.

In a flashing or interrupted light, the duration of the period of darkness has a marked effect upon the apparent brilliancy as related to the response of the human eye. The longer these dark periods with respect to the periods of light, the less the brightness as far as response of the eye is concerned, despite the fact that the actual brilliance is at some definite value above the value apparent to the eye. It is one of the principal aims in the design of motion picture projectors to consume as little time in the movement of the picture film from one picture to the next as the strength of the film will allow, since the time required for this movement determines the length of time the light beam must be intercepted and the period of interception determines the apparent brilliancy of the image. The longer the time required for film movement, the less the apparent brilliancy.

In motion picture projectors heretofore in use, many different forms of "still" picture safety shutters have been used. Some of the well known types are shown in Patents Numbers 1,830,567, 1,885,631, and 2,335,436. In all such prior constructions, the safety shutter has included a blade or filter which was movable into operative position in the path of light where it was positioned so as to eclipse some of the light rays or absorb some of the heat rays to prevent injury to the film during the showing of a "still" picture. Such "still" picture shutters heretofore in common use have been objectionable because they cause a light loss of approximately eighty-five precent in the projection of "still" pictures. Furthermore, the use of a safety shutter which is positioned in the beam of light results in a diminution of light from the center to the edges of the projected image. In some instances the decrease of light from the center to the corners of the image averaged forty percent.

I have found that, by using a rotary shutter which traverses the light beam while the film is stationary, I am able to project a still image of higher brilliancy and one in which there is no appreciable diminution of light from the center toward the edges of the image.

The accompanying drawings show only those portions of a motion picture projector which are believed necessary to a complete understanding of the three shutters and their operating mechanism.

In the form shown, the invention is applied to a projector comprising a casing 1 on which is mounted the usual feed and take-up reels (not shown) for supporting a film 2 which is fed by sprockets 3, 4, and 5, downwardly through a vertically disposed guideway 6 and a sound reproducing mechanism 7. The necessary intermittent movement is imparted to the film by a claw 8.

Formed in the film guideway is the usual aperture 9 at which each frame of the film is momentarily stopped for picture projection. Directly in front of the light aperture is an adjustable lens 10 supported in a mounting 11. Formed in the casing directly behind the film guideway is a lamp housing 12 in which is mounted the usual reflector 13, projection lamp 14, and condenser 15.

Also mounted in the casing is an electric motor 16 having a speed reducer 17 and a drive shaft 18 adapted to drive a vertically disposed driven shaft 19 which is operatively connected to the film feeding claw and sprockets. Interposed between the drive shaft and the driven shaft is an improved form of manually controlled clutch, as illustrated in Figure 5. This clutch not only controls the movement of the film but also controls the action of the improved shutters, including a motion picture interrupter shutter 20, "still" picture safety shutter 21, and fire shutter 22.

The clutch shown in Figure 5 includes a tube 23 journaled in bushings 24 in a pair of fixed bearings 25. Fixed on the tube 23 is a gear 26 meshing with a gear 27 on the vertical shaft 19. Mounted on the rear end of the tube 23 is a sleeve 28 on which is supported a pair of clutch discs 29 and 30. The disc 29 carries the motion picture interrupter shutter 20 and is provided with a hub 31 through which extends a screw 32 for clamping the sleeve 28 and disc 29 to the tube 23. The disc 30 has a hub 33 which is keyed to the drive shaft 18 so as to be continuously driven by the motor 16 while permitted a limited axial movement relative to the drive shaft.

Supported in the rear end of the sleeve 28 is a pin 34 having a head 35 on its forward end. A washer 36 is secured to the rear end of the pin by a screw 37 and this washer is of greater diameter than the sleeve 28 so as to engage an annular shoulder 38 formed in the bore of the hub 33. Embracing the forward end of the pin 34 is a spiral spring 39 which acts between the head 35 and an annular shoulder 40 on the sleeve 28 so as to draw the washer 36 forwardly, thereby urging the clutch disc 30 into frictional driving engagement with the interrupter shutter 20 which in turn drives the film feeding mechanism through the parts 29, 28, and 23.

In order to disconnect the film feeding mechanism and motion picture interrupter shutter from the continuously rotating clutch disc 30, as for instance, when it is desired to project a still image, means is provided for retracting the washer 36. This means includes an axially shiftable rod 41 which is slidably supported in the tube 23. Its rear end abuts the head 35 and its forward end abuts a cam 42 mounted on a pin 43 which is rotatably supported in a bracket 44 mounted on one of the bearings 25. The pin 43 has a knurled head 45 by which it may be turned for shifting the rod 41 and pin 34 rearwardly against the action of the spring 39.

The speed of the drive shaft 18 and its connected clutch disc 30 is such that the single blade of the interrupter shutter 20 is caused to traverse the light beam for eclipsing the rays of light at the desired frequency to prevent objectionable flicker.

The "still" picture shutter 21 is a multi-bladed disc having preferably three blades 46 and intermediate spaces 47, each of which is sixty degrees in width, as shown in Figures 4 and 6. This shutter is mounted on a disc 48 which is rotatably supported on a boss 49 formed on the clutch disc 30.

In order to prevent the "still" picture shutter 21 from eclipsing the light beam when the film feeding mechanism and interrupter shutter 20 are in operation, a magnet 50 is positioned adjacent the rim of the shutter 21 in diametrically opposed relation to the light aperture 9 so that, when the "still" picture shutter is not in operation, one of the blades 46 stops at the magnet and the opposed recess 47 is alined with the light aperture.

Embracing the hub 33 of the clutch disc 30 is a collar 51 forming a support for a plurality of helical springs 52 bearing against a washer 53. The collar 51 is secured against displacement by a retaining ring 54. Extending through the hub 49 and clutch disc 30 are spacer pins 54.1 which are arranged to abut the washer 53 and the disc 29 so as to prevent the shutter 21 from following the clutch disc 30 when the latter is moved axially into frictional driving engagement with the shutter 20. When it is desired to project a "still" picture, the cam 42 is turned to shift the rod 41 and pin 34 rearwardly so as to release the clutch disc 30 which then slides rearwardly on the sleeve 28 under the action of the springs 52. The friction drive is sufficient to overcome the holding action of the magnet 50 and the "still" picture shutter is rotated at the speed of the drive shaft 18.

The fire shutter 22 is in the form of a vertically disposed plate having lugs 55 which slidably engage a guide 56 in a housing 57 of the main casing 1. The fire shutter normally drops to the operative position shown in Figure 4 for covering the light aperture 9 to eclipse the light beam when the drive shaft 18 is stopped. Formed in the fire shutter is an opening 58 adapted to register with the light aperture 9 when the fire shutter is raised to the inoperative position shown in Figure 6 during the operation of the projector.

The fire shutter is supported by a lever 59 of an improved actuating means 60 which is arranged to lift the fire shutter to the inoperative position shown in Figure 6 when either one of the shutters 20—21 is in operation.

Upward movement of the fire shutter 22 is limited by an adjustable stop screw 61 mounted on the top wall of the housing 57 in position to engage the upper extremity of an arm 62 formed on the fire shutter.

The improved actuating means 60, which lifts the fire shutter to inoperative position, includes the lever 59 and a lever 63, both of which are pivotally supported by a pin 64 which is mounted on a bracket 65 secured to the frame housing 57. The outer end of the lever 59 is pivotally secured to the arm 62 of the fire shutter by a pin 66, and the outer end of the lever 63 carries a counterbalancing weight 67.

The inner end of the lever 63 is connected to a lost-motion connection, including a pin 68 mounted on the lever 63 and projecting through a hole 69 in the lever 59. The hole 69 is larger in diameter than the pin 68. Extending over the pin 68 is a spring 70 having its ends bent around the lower edges of the lever arms 59—63 so as to normally position the pin 68 at the bottom of the opening 69, whereby both arms 59—63 operate as a single lever for raising the fire shutter to its inoperative position. This lost-motion connection permits an "overthrow" of the actuating means 60, as hereinafter described, after the fire shutter has been stopped by the screw 61.

Formed on the lower edge of the arm 63 is a flange 71 resting on a pin 72 carried by the forward leg of a yoke 73 having an extension forming an arm 74 which is pivotally secured to the bracket 65 by a pin 75. The pin 72 and flange 71 are held in operative engagement with each other by a spring 76 embracing the pivot pin 64. The upper end of this spring bears against the top strap of the yoke 73 and its lower end is bent around the upper edges of the levers 59—63.

Supported in the lower ends of the yoke 73 are pins 77 for supporting a pair of rollers 78—79 which co-operate with centrifugal force responsive actuating means on the rotary shutters to lift the fire shutter to its inoperative position when either one of the rotary shutters is in operation.

The improved centrifugal force responsive actuating means comprises a plurality of governor weights 80 loosely supported in overlapping relation within annular recesses 81 formed in the outer faces of the two shutter discs 29—48. One end of each weight is pivotally secured to the shutter disc by a sleeve 82 which also passes through an arcuate slot 83 formed in the next adjacent weight for limiting the outward swinging movement of the weights under the centrifugal force caused by the rotation of the shutters 20—21.

The governor weights are confined by annular face plates 84 mounted on the outer faces of the shutter discs 29—48. The governor weights 80 are normally retracted by springs 85. One end of each spring is anchored in a sleeve 82, as shown in Figure 5, and its other end engages an aperture 86 in the central portion of the adjacent weight. Lugs 87 formed on the face plates 84 embrace the springs adjacent their fixed ends. To permit the free ends of the springs 85 to move outwardly under the action of the governor weights, the face plates 84 are slotted as shown at 88.

As illustrated in Figure 5, the two rollers 78—79 ride on the rims of the discs 29—48 in position to be actuated by the outer edges of the governor weights when the weights are thrown outwardly under centrifugal force during the rotation of the respective shutter.

As hereinbefore described, when the projector motor 16 and its drive shaft 18 are stopped, the fire shutter 22 occupies its operative position, as shown in Figure 4, so as to completely eclipse the light beam. While the motor 16 and its drive shaft 18 are in operation, one of the rotary shutters is being driven by the motor.

To operate the projector for projecting motion pictures, the cam 42 is turned so as to permit the rod 41 to move forwardly under the action of the spring 39 which also urges the pin 34 and its washer 36 forwardly to move the clutch disc 30 into frictional driving engagement with the motion picture interrupter shutter 20.

During the operation of the motion picture interrupter shutter 20, the tube 23 is also driven through the connection 29, 32, 26, for driving the vertical shaft 19 which in turn drives the film feeding sprockets and claw. While the motion picture interrupter shutter 20 is in operation, its governor weights 80 are thrown outwardly so as to lift the roller 29 and its connected yoke 76, thereby raising the lever 59 so as to lift the fire shutter 22 until its opening 58 registers with the light aperture 9. Any overthrow of the governor weights 80 after the shutter arm 62 has engaged the stop pin 61 will cause the pin 63 of the lever 63 to ride upwardly in the opening 69 of the lever 59.

When it is desired to project a "still" image, the cam 42 is turned so as to shift the rod 41 and pin 34 rearwardly against the action of the spring 39, thereby releasing the clutch disc 30. Thereupon, the helical springs 52 acting against the collar 51 and washer 53 force the clutch disc 30 rearwardly into frictional driving engagement with the "still" picture shutter 21. When the clutch disc 30 moves away from the interrupter shutter 20, the disc 23 stops, thereby stopping the film feeding mechanism.

During the operation of the "still" picture shutter 21, the roller 78 is raised for again lifting the fire shutter 22 to inoperative position.

Upon the stopping of both of the rotatable shutters, the yoke 76 drops to the position shown in Figure 4, thereby closing the fire shutter 22.

Although but one specific embodiment of this invention has been herein shown and described, it will be understood that details of the construction shown may be altered without departing from the spirit of the invention as defined by the following claims.

I claim:

1. A cinematograph comprising a casing having a film guideway provided with a light aperture, a light source for directing light forwardly through said aperture, mechanism for intermittently feeding a film through said guideway, said mechanism being adapted to be stopped to permit the projection of a still image, a pair of light interceptors located between said light source and light aperture, one of said interceptors being rotated by said mechanism during the feeding of the film, means operable upon the stopping of said mechanism for rotating the other of said interceptors to intermittently interrupt heat rays emanating from the light source to prevent blistering of the film during the projection of a still image, and magnetic means arranged to normally attract said other interceptor to an inoperative position out of the path of light during the rotation of said one interceptor.

2. A cinematograph comprising a casing having a light aperture, a light source behind said aperture, a motion picture interrupter shutter and a still picture shutter arranged co-axially in spaced relation to each other between said light source and said aperture, film feeding mechanism operatively connected to said interrupter shutter, an axially movable clutch disc rotatably mounted between said shutters, manually operable means for shifting said clutch disc axially into driving engagement with either one of said shutters, a fire shutter normally movable into operative position behind said aperture for eclipsing the light beam, and actuating means operable by either said interrupter shutter or said still picture shutter for moving said fire shutter to its inoperative position.

3. A cinematograph comprising a casing having a light aperture, a light source behind said aperture, a motion picture interrupter shutter and a still picture shutter arranged co-axially in spaced relation to each other between said light source and said aperture, film feeding mechanism operatively connected to said interrupter shutter, an axially movable clutch disc rotatably mounted between said shutters, manually operable means for shifting said clutch disc axially into driving engagement with either one of said shutters, a fire shutter normally movable into operative position behind said aperture for eclipsing the light beam, and centrifugal force responsive actuating means operable upon the rotation of either said interrupter shutter or said still picture shutter for moving said fire shutter to its inoperative position.

4. In a motion picture projector that comprises a light source, a drive shaft adapted to be rotated continuously and film-advancing mechanism; a pair of rotatable shutter discs disposed respectively to intermittently interrupt a projection light beam from said source during rotation, one said shutter being permanently operatively connected to said film-advancing mechanism and having light-passing and intercepting portions arranged to pass a maximum amount of light for motion picture projection, the other said shutter being independent of said film-advancing mechanism and having light-passing and intercepting portions arranged to intercept sufficient light to prevent heat damage of an arrested film, and means for selectively coupling either the first shutter and film-advancing means or the second shutter alone to said drive shaft.

ARTHUR S. DEARBORN.

REFERENCES CITED

The following references are of record in the file of this patent:

UNITED STATES PATENTS

| Number | Name | Date |
| --- | --- | --- |
| 1,092,905 | Gall | Apr. 14, 1914 |
| 1,165,513 | Kamm | Dec. 28, 1915 |
| 1,197,568 | Weeks | Sept. 5, 1916 |
| 1,369,694 | Mladinich et al. | Feb. 22, 1921 |
| 1,676,542 | Fritts | July 10, 1928 |
| 1,690,633 | Green | Nov. 6, 1928 |
| 1,719,377 | Kosken | July 2, 1929 |

FOREIGN PATENTS

| Number | Country | Date |
| --- | --- | --- |
| 93,082 | Austria | June 11, 1923 |
| 372,166 | Germany | Mar. 24, 1923 |
| 679,630 | France | Jan. 10, 1930 |